A. DELKESCAMP.

Dies for Cutting out Ornamental Forms of Paper.

No. 5,635. Reissued Oct. 28, 1873.

Witnesses,

Alf. Westbrook

Arnold Hörmann

Inventor,

Adolph Delkescamp by his attorney

J. L. Stetson

AM. PHOTO-LITHOGRAPHIC Co. N.Y. (OSBORNE'S PROCESS)

UNITED STATES PATENT OFFICE.

ADOLPH DELKESCAMP, OF BROOKLYN, E. D., ASSIGNOR TO JACOB J. NICHOLS, OF NEW YORK, N. Y.

IMPROVEMENT IN DIES FOR CUTTING OUT ORNAMENTAL FORMS OF PAPER.

Specification forming part of Letters Patent No. 137,063, dated March 25, 1873; reissue No. 5,635, dated October 28, 1873; application filed August 21, 1873.

*To all whom it may concern:*

Be it known that I, ADOLPH DELKESCAMP, of Brooklyn, E. D., in Kings county, New York, have invented a certain Improvement in Dies for Cutting out Ornamental Forms of Paper, of which the following is a specification:

The invention is intended more particularly for the production of variously-curved and elaborate slender forms in paper, to be cemented upon glass globes and other objects of glass for exposure to the sand-blast. Paper is not cut by the sand, and protects the surface beneath it in its polished condition, while the surfaces not protected are rapidly abraded under the violent impact of the small gritty particles. The paper forms thus produced may, obviously, be useful for various other decorative and other purposes; and the present invention may be applied to the manufacture of forms in other material than paper. I will proceed to describe what I consider the best means of carrying out the invention as applied to the production of paper shapes for glass decorating.

The accompanying drawing forms a part of this specification.

Figure 1:
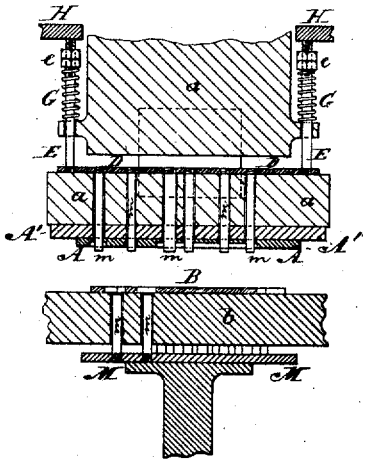
Figure 2:
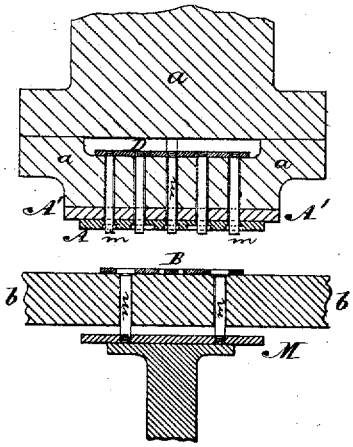
Figure 3:
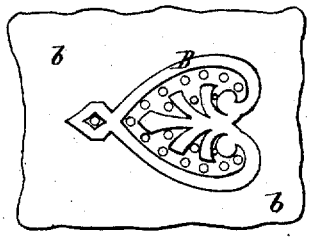
Figure 4:
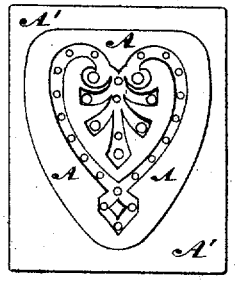

Figure 1 is a vertical section through the upper part of the bed and the lower part of the platen or plunger. Fig. 2 is a vertical section at right angles to Fig. 1. Fig. 3 is a top view of the bed, with its attached male die; and Fig. 4 is a view from below, showing the under face of the plunger with its female die.

Similar letters of reference indicate corresponding parts in all the figures.

I can employ a press of any suitable construction, and operated by hydraulic force, or by other means. I do not consider it necessary to represent the press, but only the novel parts, with so much of the adjacent parts as is necessary to explain their relation thereto.

A is a layer of pure Banca tin, or analogous soft metal, molded upon a thin backing-plate, A′, which may be of copper and fixed upon the under face of a plunger, *a*. The soft stratum A may, for such patterns as I have employed in decorating glass globes, be about one-fourth ($\frac{1}{4}$) of an inch thick. The male die, which is of harder material, is forced into this layer A to a depth of about one-sixteenth ($\frac{1}{16}$) of an inch, and thus initiates the formation of a female die, to be afterward completed, as set forth below. B is the male die, formed of hardened steel, or other suitable material, firmly secured upon the upper face of a substantial bed-casting, *b*. The plunger *a* is worked up and down through a considerable space—say, an inch or more. The press should provide means for depressing it and its attachments with force, particularly at the lower extremity of its motion. So far as thus described, the parts would cut out the forms successfully; but the thin and branching strips of paper thus cut out would be liable to stick either to the male or female die, or both. The nature of the work forbids the introduction of any ordinary means for clearing the parts. The male die must present a practically plane face to avoid distorting the delicate shapes thus produced. The waste material cut out from the spaces in the pattern, tending to remain around and within the spaces in the male die B, need not be so carefully treated; but I will describe the means which I have adopted whereby the paper is freed from both without distortion. I drill small holes thickly over the entire sunk portion of the female die A A′, producing the holes quite through the soft metal A, and also through the supporting material *a* above it, and introduce corresponding slender pins *m*, screwed or otherwise secured in a plate, D, mounted above, and capable not only of moving with the plunger, but also a quarter of an inch, more or less, motion up and down in a recess within the plunger. I also drill holes in the spaces around the male die B, and provide corresponding pins *m*, correspondingly fixed in a slightly-movable plate, M, below. The press operates the plate M, and its attached pins *m*, by cams and connections, (not represented,) so that at each separation of the dies A and B the pins *m* are protruded from their respective holes, and actively push out the paper lying in their way. A gentle current of air from a fan or analogous apparatus may be brought to bear on the paper as soon as liberated by the pins, so as to more effectually remove the waste material; but in many cases such an addition may not be necessary. The acting ends of the pins *m* should be ground off at right angles to their axes, and when the pins are drawn back they should be flush with or a little below the adjacent surfaces of the respective dies.

The success of the operation depends on a certain degree of stiffness of the paper or analogous material which is treated. I have experimented successfully with unsized paper of ordinary thickness, suitable for securing, by gum-arabic or other cement, on glass globes, to produce figures by the sand-blast. I believe that nearly all kinds of paper, as also many other kinds of thin material, may be treated by this means.

One mode of operating the upper plate D and its attached pins *m* to clear the paper out of the recesses in the female die A is to simply allow the piece D and its attachments to sink by gravity, and be forced upward by the contact of the lower end of its pins with the surface of the paper. It will, with many patterns, be safe to depend on the gravity of these parts as sufficient to depress the pins with certainty, while it need not be sufficient to punch or indent or otherwise injure the paper forms which are produced. I have provided, however, as a means of insuring against possible difficulty, for giving not only the lower plate M and its attachments a positive motion up and down at each operation of the press, but also for giving the upper plate D and its attachments a corresponding positive motion.

E E are rods which take hold of the projecting ends of the upper plate or pin-carrier D, and extend upward through guides carried on the plunger *a*, so as to rise and sink with it, except as they are acted on by the additional forces now to be described. G G are springs acting under adjustable nuts *e* on the rods E, and tending to hold the plate D always in its highest possible position in the plunger *a;* but when the latter, which has considerable vertical motion, has risen nearly to its highest position, the upper ends of the rods E E strike against stops H H mounted on the fixed framework of the press, (not represented,) and thus cause the upward motion of the plate D and its attachments to be arrested. The further upward movement of the plunger *a*, under these conditions, results in an apparent depression of the pins *m*, and their protrusion below, so as to detach the paper. As the plunger *a* and its attachments commence to sink again, the plate D and its attached pins *m* remain, and retreat or relatively rise in the plunger.

Thus mounted and operated, the upper pins *m* are always withdrawn, except when the plunger *a* is in or near its highest position.

The softness of the die A not only allows the formation of this die so as to exactly match, with little expense, but also avoids chipping or dulling the hard die when, in consequence of springing or other cause, it is forced a little to either side, so as to touch the other die.

Although I prefer that the soft layer A shall be tin, I believe it practicable to operate with various alloys and other materials which will give an approximately-corresponding degree of resistance to the die. It is important that the material shall be soft enough to receive the male die a little distance, either at ordinary temperatures, or when softened by heat or other means, so as to produce a recess corresponding to the male die; and that it shall, also, be hard enough to allow the sharp corners of the male die to act within it, and cleanly cut the outline of the figure in the paper or other material employed.

It will be obvious that the position of the male and female dies and their respective attachments may be reversed, if preferred, so that the female die shall be below and the male die above; or that the entire apparatus may be worked with horizontal or variously inclined motions.

It has been common heretofore in machines for cutting dough, splitting wood, &c., to employ clearers acted on by springs. Such I do not claim, broadly, but only with my peculiar cutting-dies.

I claim as my invention—

1. A pair of matched cutting-dies, one of hard and the other of soft metal, operating together to cut paper and analogous material, as herein specified.

2. In combination with dies A B, operating as specified, the clearing-pins *m*, sinking out of the way when the dies are acting, and protruded when the dies are separated, so as to expel the thin material by acting on thickly-distributed points on its surface, as herein specified.

In testimony whereof I have hereunto set my hand this 28th day of July, 1873.

ADOLPH DELKESCAMP.

Witnesses:
ALFD. WESTBROOK,
WM. C. DEY.